Nov. 8, 1960     W. H. KUNZ     2,959,060
CONTROL APPARATUS

Filed Aug. 17, 1959     3 Sheets-Sheet 1

INVENTOR
WALDEN H. KUNZ
BY Roger W. Jensen
ATTORNEY

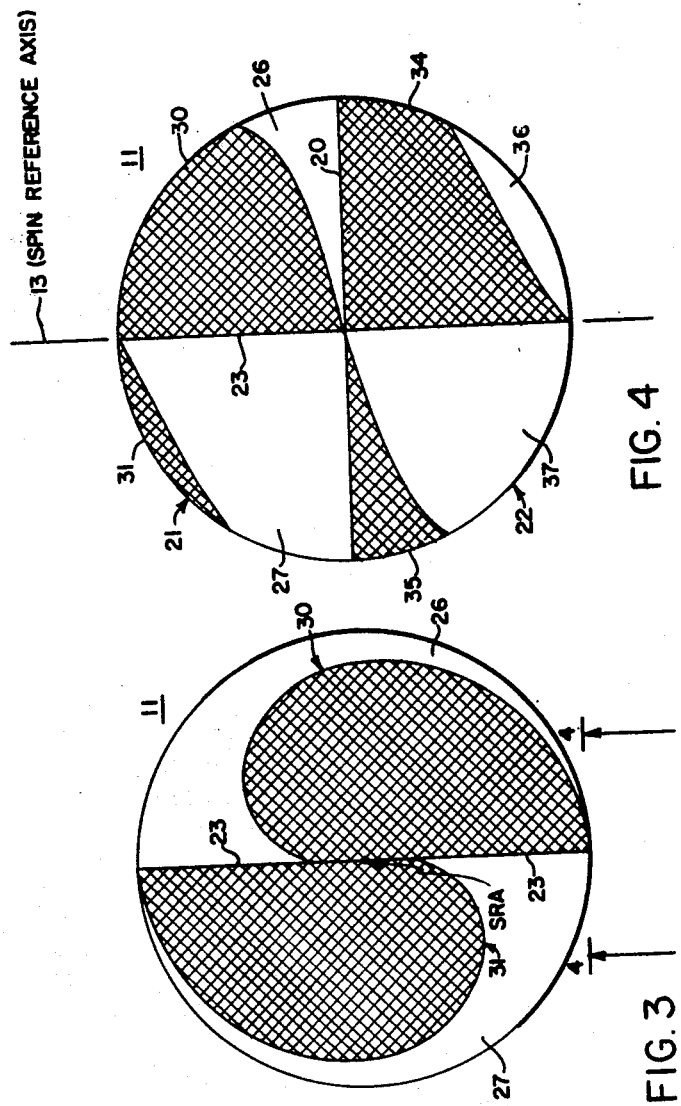

Nov. 8, 1960  W. H. KUNZ  2,959,060
CONTROL APPARATUS
Filed Aug. 17, 1959  3 Sheets-Sheet 3
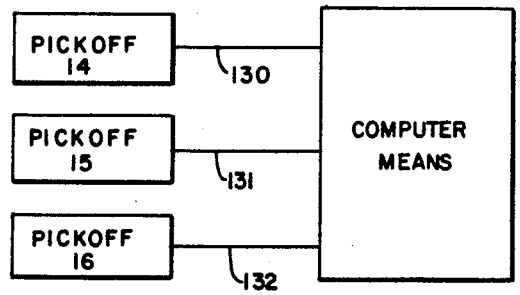
FIG. 6
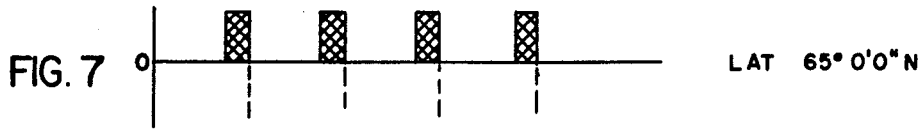
FIG. 7  LAT 65° 0' 0" N
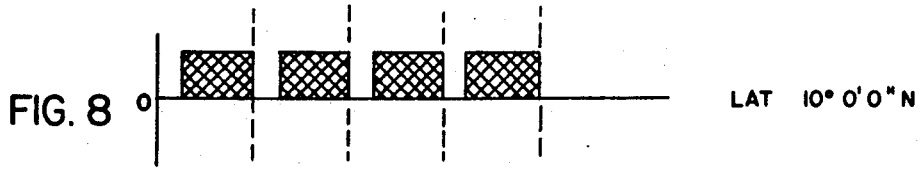
FIG. 8  LAT 10° 0' 0" N
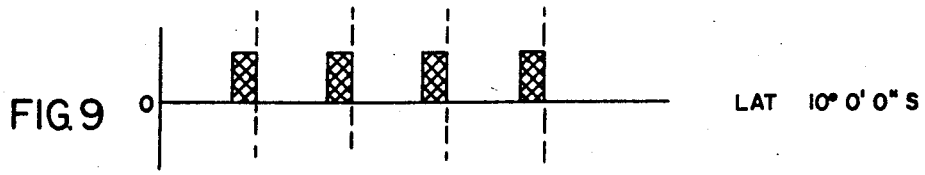
FIG. 9  LAT 10° 0' 0" S
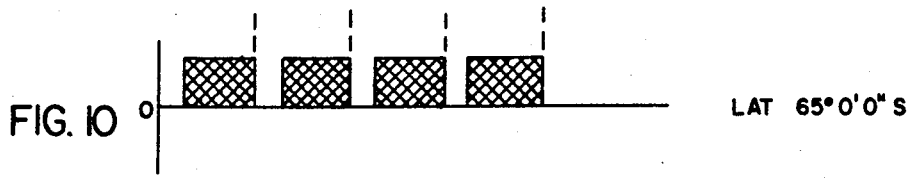
FIG. 10  LAT 65° 0' 0" S
INVENTOR
WALDEN H. KUNZ
BY Roger W. Jensen
ATTORNEY United States Patent Office 2,959,060
Patented Nov. 8, 1960

2,959,060

CONTROL APPARATUS

Walden H. Kunz, St. Paul, Minn., assignor to Minneapolis-Honeywell Regulator Company, Minneapolis, Minn., a corporation of Delaware Filed Aug. 17, 1959, Ser. No. 834,033

14 Claims. (Cl. 74—5.6)

This invention pertains to means, in combination with a support member and a spherically shaped rotor member universally supported on said support and adapted to spin relative to said support about a spin axis, for sensing and measuring relative rotation between the support member and the rotor member about any axis which is at an angle to the spin axis. This invention has specific application to the field of gyroscopic instruments comprising in part a spherically shaped rotor element universally supported by suitable means on a support. The rotor element will have a fixed spin axis and will tend to remain fixed in inertial space except for precessional errors. Rotational movement of the support member will produce apparent relative rotation between the rotor element and the support. The present invention provides a unique means of measuring any relative rotation between the spherically shaped rotor and its support means. Briefly the present invention comprises in part a uniquely characterized pattern applied to the surface of the rotor element. The pattern includes certain areas or sectors which are characterized by having radiation properties and by other areas or sectors which are characterized by being substantially non-radiative. Radiation responsive pickoffs, such as for example an optical sensing device, are positioned so as to sense radiation from the spherically shaped element. As the rotor element spins about its spin axis the sensing means will alternately "see" radiative and non-radiative areas. The invention provides that the boundary between the radiative and non-radiative areas or sectors be characterized or shaped as a function of latitude. This results in the signal produced by the sensing means to vary also as a function of latitude.

It is an object of this invention therefore to provide an improved control apparatus and more specifically to provide a pickoff for measuring relative rotation between a universally supported spinning sphere and its support about any axis at an angle to the spin axis.

It is a further object of the invention to provide in combination with a support and a spherically shaped spinning rotor supported thereby a pickoff means characterized by producing a repetitive signal as a function of rotor speed where the signal is further characterized as a function of latitude.

Other and more specific objects of the invention, including constructional details and the operation of pickoffs embodying my invention, will be set forth more fully in and become apparent from a reading of the following specification and appended claims, in conjunction with the accompanying drawings in which:

Figure 3 is a top view of a rotor element having a special coded pattern thereon in accordance with the teaching of the present invention;

Figure 4 is a side view of the rotor element shown in Figure 3;

Figure 6 is a system block diagram showing the pickoff means connected to computer means; and Figures 7, 8, 9 and 10 show typical output signals from one of the radiation sensors for different relative latitudes between the sensor and the spherically shaped rotor.

Figure 1:
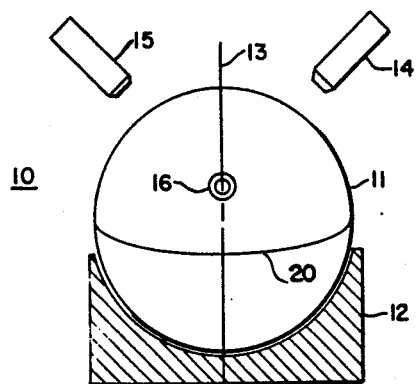
Figure 1 is a schematic representation of a gyroscope comprising a rotor element universally supported on a support means and having associated with it three radiation sensor devices orthogonally positioned.
Figure 2:
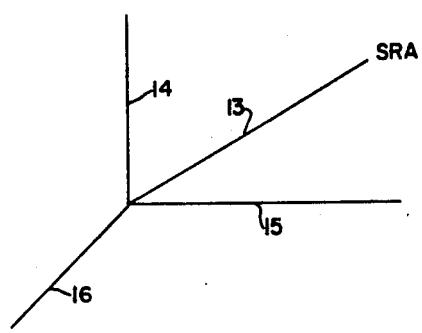
Figure 2 is a representation of the sensing axes of the radiation sensors with respect to the spin reference axis of the gyroscope.

Referring to Figure 1, the reference numeral 10 generally depicts a gyroscope comprising a spherically shaped rotor element 11 universally supported relative to a support means 12 by any suitable means such as air bearings or the like and adapted to spin about a spin reference axis 13 under the influence of suitable spinning means or rotation impelling means not shown. A plurality of radiation sensors 14, 15 and 16 are positioned by suitable means so as to receive radiation from the rotor element 11. As shown the sensors 14, 15 and 16 are orthogonally positioned with respect to each other, this being shown in Figure 2 where their sensitive axes are respectively identified by reference numerals 14', 15' and 16'. Figure 2 also shows the general relationship between the sensitive axes of the pickoff means and the spin reference axis 13 of the rotor 11.

Figures 3 and 4 respectively show the top and side views of a typical rotor element. As shown, the rotor 11 has applied thereto a characterized pattern and as shown the dark portions designate non-radiative areas while the light portions designate areas of substantial radiation. As used herein, the expression or term "radiation" or "radiative" shall be understood to include a wide variety of surface properties. The invention will be specifically described in connection with surfaces which are either light reflective or non-light reflective but it will be understood that the invention may also be practiced by having surfaces which are either radiative or non-radiative in other senses. For example, the surfaces may be characterized by either being fluorescent or non-flourescent and also by being either opaque or translucent or transparent.

The radiation or non-radiation properties may also be a function of magnetic fields or of electric fields. Further the scope of the invention should include patterns which derive their radiation or non-radiation characteristics from radioactive materials.

The specific pattern applied to the rotor element 11 of Figures 3 and 4 generally consists of a meridional circle intersecting the rotor spin axis and a spiral cosine curve. More specifically, the surface of the rotor is divided into four quadrants by an equatorial line 20 and a meridional circle 23. The equator 20 defines an upper hemisphere 21 and a lower hemisphere 22. Each quadrant has a radiative sector and a non-radiative sector with the boundaries between the radiative and non-radiative sectors being characterized in that they vary longitudinally as a function of latitude. At each of the two intersections of the meridian 23 and the equator 20 there begins a radiative area or sector extending upwardly into the upper hemisphere 21, these radiative sectors being identified by reference numerals 26 and 27. The remainder of the upper hemisphere 21 is non-radiative and this non-radiative portion is divided into two sectors 30 and 31 lying on opposite sides of the meridian circle 23. The boundary between radiative sectors 26 and 27 and non-radiative sectors 30 and 31 respectively are characterized as a function of latitude. Stated otherwise, the boundaries vary longitudinally from the meridional circle 23 as a function of latitude. The specific function shown is a cosine function. It will be understood that other predetermined functions may be used as well.

The lower hemisphere 22 also has a coded pattern applied thereto. The arrangement shown is such that the pattern on the lower hemisphere is generally reversed from that on the upper hemisphere. Thus the lower hemisphere 22 adjacent to the equator 20 has a pair of non-radiative portions or sectors 34 and 35, the balance of the lower hemisphere 22 being covered by radiative areas or sectors 36 and 37. Again the boundaries between the sectors 34, 36 and 35, 37 have a predetermined characteristic as a function of latitude, shown as a cosine function. By having the pattern on the lower hemisphere reversed from that on the upper hemisphere, there will be a definite transition point for the pickoff between the hemispheres so that there will be no doubt as to which hemisphere is being "seen."

Figure 5:
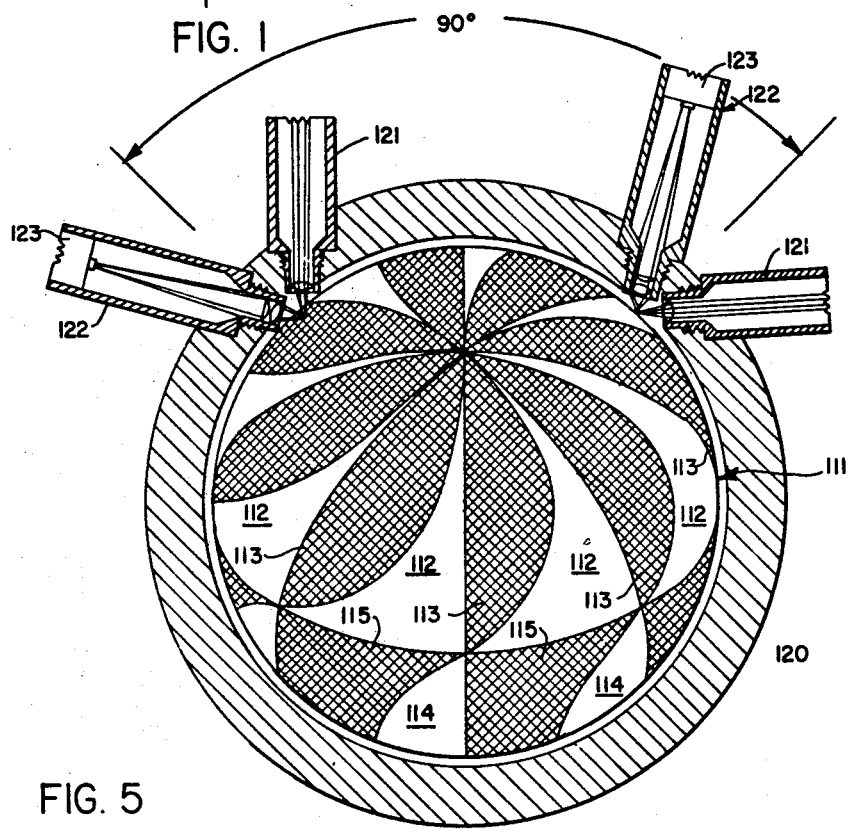
Figure 5 is a perspective view of a rotor element universally supported and having a somewhat different pattern configuration thereon from that shown in Figures 3 and 4.

Referring now to Figure 5, the rotor is identified by reference numeral 111 and has applied thereto a pattern similar to that shown in Figures 3 and 4, except that it has been repeated eight times instead of only twice as shown in Figures 3 and 4. Thus, where one meridian circle divided the surface of the rotor in Figures 3 and 4, four equally spaced meridian circles divide the surface of the rotor into eight sections, each of which is divided in two by the equator. The radiative sectors on the upper hemisphere of the rotor 111 are designated by reference numeral 112 while the non-radiative areas or sectors are designated by reference numeral 113. In the lower hemisphere the radiative portions are identified by reference numeral 114 while the non-radiative sections are identified by reference numeral 115. As for the rotor shown in Figures 3 and 4, the radiative sectors 112 and 114 are separated from the non-radiative portions 113 and 115 by a boundary which longitudinally varies as a function of latitude, the specific function depicted being a cosine. A spherically shaped support envelope or shell 120 encloses the rotor element 111 and also provides a means for positioning the pickoffs which sense radiation from the rotor. In Figure 5 only two of the three pickoffs are shown. As shown the pickoffs are of the optical type. Each pickoff includes a source of light 121 which projects a fine point of light on the surface of the sphere or rotor 111. Each pickoff also includes a radiation sensor generally designated by the reference numeral 122 and which includes an optical system for taking light rays emanating from the surface of the rotor and causing the light rays to impinge against a signal producing means generally designated by the reference numeral 123. The signal producing means 123 may be a phototransistor or other suitable means characterized by producing signals indicative of light imparted thereto. In each pickoff the light producing means 121 and the sensing means 122 are directed to substantially the same point on the surface of the rotor 111. Thus, when the light from the light producing means 121 falls upon the radiative surfaces or light reflecting surfaces 112 and 114, this light is radiated or reflected into the signal producing means 123 so as to produce a signal. Also when the pickoffs are directed towards a non-radiative surface, there will be an absence of radiation imparted to the signal producing means.

It will be understood that the rotor element 111 will be rotating at substantially a constant angular velocity. For any given orientation between the support 120 and the rotor 111 at least two of the three pickoffs will have light intermittently applied thereto. Usually all three pickoffs will be so affected, but when a pickoff is viewing one of the two poles or ends of the spin axis, then it will not receive an intermittent signal. Thus for any orientation at least two of the pickoffs will "see" alternate radiative and non-radiative areas or sectors which will result in a pulsing signal to be produced thereby. When a sensor is viewing the upper hemisphere as shown in Figure 5 the closer it is to the equator then the greater will be the ratio of "on-time" to "off-time." In the upper hemisphere as the pickoff moves towards the pole, the ratio of "on-time" to "off-time" decreases as a function of the cosine of the latitude. At the equator there is a change to the pattern on the lower hemisphere. In the lower hemisphere near the equator the ratio of "on-time" to "off-time" is relatively small and as the pickoff moves toward the lower pole the ratio of "on-time" to "off-time" becomes progressively larger.

The variation in signal output for one pickoff as its relative latitude with respect to the spinning sphere changes is depicted in Figures 7–10. Figure 7 depicts a signal output for a relative latitude of 65 degrees north (upper hemisphere) and it will be noted that the "on" portion of the signal is a small fraction of the total cycle of an "off-time" and "on-time." At 10 degrees north as depicted in Figure 8 the "on" portion is substantially greater than that for Figure 7. In Figure 9 a latitude of 10 degrees south (lower hemisphere) is depicted while a latitude of 65 degrees south is depicted in Figure 10. As indicated, and as is shown in Figures 9 and 10, the more the pickoff rotates toward the south pole (the pole of the lower hemisphere 22) the greater the ratio of "on-time" to "off-time."

In Figure 6 a block diagram of the system is depicted wherein the three pickoffs 14, 15 and 16 are electrically connected by suitable connection means 130, 131 and 132 to a suitable computer 133. The details of the computer 133 are not specifically disclosed herein since they may take a wide variety of configurations according to the particular desired outputs. It will be generally understood that by having three spaced pickoffs such as 14, 15 and 16 viewing a characterized pattern of the type shown that the signals produced thereby will uniquely define the angular relationship between the support and the rotor. Thus the function of the computer is to transform the three signals from the pickoffs 14, 15 and 16 into angular information of the type desired. For example, if the gyro described is to be used in an attitude control system, the computer means 133 would serve as a link or coupler between the gyro and the means controlling the attitude of the craft upon which the gyro is mounted.

By having the lower hemisphere coded in a reverse sense from the upper hemisphere, the pickoff means always will be able to differentiate between the two hemispheres. This may also be accomplished by having suitable memory features incorporated into the computer means. When three spaced apart sensors are used there is no redundancy in output signals for the upper and lower hemispheres. This is because, although an individual sensor may produce equal signals for two different latitudes (one of which is in the upper hemisphere and the other of which is in the lower hemisphere) there is no possibility of the three orthogonally positioned sensors ever being positioned relative to the rotor where equal signals would be produced from both hemispheres.

It should be understood that while the sensors have been shown orthogonally spaced with respect to each other, that other spacings may be used within the scope of the invention. Othogonal spacing is the most convenient from the standpoint of simplicity of the computer but other spacings will work equally as well from the broad standpoint of sensing information.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In apparatus of the class described: a support; a spherically shaped rotor having two hemispheres and universally supported by said support and adapted to be rotated about a spin axis; and means for measuring relative rotation between said rotor and said support about any axis at an angle to said spin axis, said measuring means comprising a plurality of sectors on each hemisphere of said rotor, said sectors being alternately light reflecting and non-light reflecting and said sectors being characterized by the boundary between a pair of sectors being a spiral cosine, means for applying light to said rotor, three optical pickoffs orthogonally positioned on said support, each of said pickoffs including means for producing signals indicative of the amount of light sensed thereby, and computer means connected to said pickoff signal producing means.

2. In apparatus of the class described: a support; a spherically shaped rotor having two hemispheres and universally supported by said support and adapted to be rotated about a spin axis; and means for measuring relative rotation between said rotor and said support about any axis at an angle to said spin axis, said measuring means comprising a plurality of sectors on each hemisphere of said rotor, said sectors being alternately light radiating and non-light radiating and said sectors having a characterized boundary therebetween, means for applying light to said rotor, and a plurality of optical pickoffs positioned on said support and adapted to sense light from said rotor, each of said pickoffs including means for producing signals indicative of the amount of light sensed thereby.

3. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a pair of sectors on said rotor, one of said sectors being light radiating and the other of said sectors being non-light radiating and said sectors being characterized by the boundary therebetween being a predetermined function, means for applying light to said rotor, a plurality of optical pickoffs positioned on said support and adapted to sense light from said rotor, each of said pickoffs including means for producing signals indicative of the amount of light sensed thereby, and computer means connected to said pickoff said pickoff signal producing means.

4. In apparatus of the class described: a support; a spherically shaped rotor having two hemispheres and universally supported by said support and adapted to be rotated about a spin axis; and means for measuring relative rotation between said rotor and said support about any axis at an angle to said spin axis, said measuring means comprising a plurality of sectors on each hemisphere of said rotor, said sectors being alternately light radiating and non-light radiating and the sectors of each hemisphere having characterized boundaries therebetween, means for applying light to said rotor, a plurality of optical pickoffs positioned on said support and adapted to sense light from said rotor, each of said pickoffs including means for producing signals indicative of light sensed thereby, and computer means connected to said pickoff signal producing means.

5. In apparatus of the class described: a support; a spherically shaped rotor having two hemispheres and universally supported by said support and adapted to be rotated about a spin axis; and means for measuring relative rotation between said rotor and said support about any axis at an angle to said spin axis, said measuring means comprising a plurality of sectors on each hemisphere of said rotor, said sectors being alternately radiative and non-radiative and said sectors having a characterized boundary therebetween, a plurality of pickoffs positioned on said support and adapted to sense radiation from said rotor, each of said pickoffs including means for producing signals indicative of radiation sensed thereby, and computer means connected to said pickoff signal producing means.

6. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a pair of sectors on said rotor, one of said sectors being radiative and the other of said sectors being non-radiative and said sectors having a characterized boundary therebetween, and a pickoff positioned on said support and adapted to sense radiation from said rotor, said pickoff including means for producing a signal indicative of radiation sensed thereby.

7. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a pair of adjacent sectional areas on said rotor, one of said areas being radiative and the other of said areas being non-radiative and said areas having a characterized boundary therebetween, a pickoff positioned on said support and adapted to sense radiation from said rotor, said pickoff including means for producing a signal indicative of radiation sensed thereby.

8. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of sectors on said rotor, some of said sectors being radiative and some of said sectors being non-radiative and adjacent radiative and non-radiative sectors having a characterized boundary therebetween, and pickoff means adapted to sense radiation from said rotor including means for producing signals indicative of radiation sensed thereby.

9. In apparatus of the class described: a spherically shaped rotor adapted to be rotated about a spin axis; and means for measuring relative rotation between said rotor and a support about any axis at an angle to said spin axis, said measuring means comprising a pair of sectors on said rotor, one of said sectors being radiative and the other of said sectors being non-radiative and said sectors having a characterized boundary therebetween.

10. In apparatus of the class described: a support; a spherically shaped rotor having two hemispheres separated by an equator and universally supported by said support and adapted to be rotated about a spin axis; and means for measuring relative rotation between said rotor and said support about an axis at an angle to said spin axis, comprising a characterized pattern on said rotor including a radiative portion and a non-radiative portion, said portions being separated by a boundary which intersects said equator of said rotor and which longitudinally deviates from a meridional line passing through said intersection by a predetermined function of latitude.

11. In apparatus of the class described: a spherically shaped support member; a spherically shaped rotor member universally supported by said support member and adapted to be rotated about a spin axis; and means for measuring relative rotation between said members about an axis at an angle to said spin axis, comprising a characterized pattern on one of said members including a radiative portion and a non-radiative portion, said portions being separated by a boundary which intersects the equator of said one of said members and which longitudinally deviates from a meridional line passing through said intersection by a predetermined function of latitude.

12. In apparatus of the class described: a support; a spherically shaped rotor universally supported by said support and adapted to be rotated about a spin axis; and means for measuring relative rotation between said rotor and said support about an axis at an angle to said spin axis, said measuring means comprising a pair of sectors on said rotor, one of said sectors being radiative and the other of said sectors being non-radiative, pickoff means positioned in radiative proximity with respect to said rotor and having means for producing a signal indicative of radiation sensed thereby, said sectors being separated by a boundary which varies longitudinally by a predetermined function of latitude so that the signal produced by said signal producing means varies as a predetermined function of latitude.

13. Means for sensing relative latitude between a point on a support member and a spherically shaped rotor member universally supported on said support and adapted to spin relative to said support about a spin axis, said means comprising a characterized radiation pattern on one of said members having a variation in radiation characteristics as a function of latitude and a radiation responsive pickoff mounted on the other of said members.

14. Means for sensing relative latitude between a point on a support member and a spherically shaped rotor member universally supported on said support and adapted to spin relative to said support about a spin axis, said means comprising a characterized radiation pattern on said rotor having a variation in radiation as a function of latitude and a radiation responsive pickoff mounted in radiative proximity with respect to said rotor.

References Cited in the file of this patent
UNITED STATES PATENTS

| | | |
|---|---|---|
| 1,335,055 | Hedenstrom | Mar. 30, 1920 |
| 2,270,876 | Esual et al. | Jan. 27, 1942 |
| 2,512,598 | Barkalow | June 27, 1950 |
| 2,856,778 | Kiebert | Oct. 21, 1958 |